United States Patent [19]
Reiher et al.

[11] Patent Number: 5,610,298
[45] Date of Patent: Mar. 11, 1997

[54] WATER-SOLUBLE ANTHRAQUINONE COMPOUNDS, PREPARATION THEREOF AND USE THEREOF AS DYES

[75] Inventors: Uwe Reiher, Hofheim; Werner H. Russ, Flörsheim, both of Germany

[73] Assignee: Hoechst Aktiengesellschaft, Germany

[21] Appl. No.: 441,052

[22] Filed: May 15, 1995

[30] Foreign Application Priority Data

May 17, 1994 [DE] Germany ................ 44 17 192.7
Jul. 14, 1994 [DE] Germany ................ 44 24 819.9

[51] Int. Cl.$^6$ .................. C07D 251/54; C07D 251/50; C07D 251/52
[52] U.S. Cl. .................. 544/197; 544/208; 544/210
[58] Field of Search ...................... 544/197, 208, 544/210

[56] References Cited

U.S. PATENT DOCUMENTS

| | | | |
|---|---|---|---|
| 3,133,921 | 5/1964 | Brazzel | 544/194 |
| 3,242,176 | 3/1966 | Jenny | 544/194 |

FOREIGN PATENT DOCUMENTS

| | | |
|---|---|---|
| 1182124 | 6/1959 | France . |
| 1326769 | 8/1963 | France . |
| 1934518 | 7/1958 | Germany . |
| 1544354 | 10/1970 | Germany . |
| 1118410 | 7/1968 | United Kingdom . |

OTHER PUBLICATIONS

European Search Report No. 95106594.5, Oct. 25, 1995.
Archivum Immunologiae et Therapiae Experimentalis, vol. 32, No. 3, pp. 247–253, 1984.
Chemical Abstracts, vol. 60, No. 10, Abstract No. 12150a, May 11, 1964.

*Primary Examiner*—Yogendra N. Gupta
*Attorney, Agent, or Firm*—Connolly & Hutz

[57] ABSTRACT

Anthraquinone compounds having the formula (1)

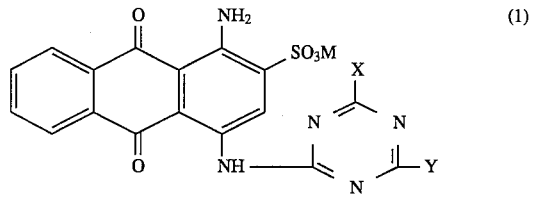

are useful as fiber-reactive dyes for dyeing hydroxy and/or carboxamido-containing material, especially fiber material such as cellulose, wool and synthetic polyamide. In one embodiment, X is cyanoamino and Y is β-sulfatoethylsulfonylphenylamino.

8 Claims, No Drawings

WATER-SOLUBLE ANTHRAQUINONE COMPOUNDS, PREPARATION THEREOF AND USE THEREOF AS DYES

The invention is in the technical field of fiber-reactive dyes.

From the practice of dyeing with fiber-reactive dyes come more stringent requirements with regard to the quality of the dyeings and to the economy of the dyeing processes. As a result of this, there continued to be a need for novel fiber-reactive dyes which possess enhanced properties. For the production of dyeings in blue shades, in particular, there is a demand for fiber-reactive dyes which give such dyeings with good fastness properties. Examples of dyes which are of interest in this connection are blue to reddish blue fiber-reactive dyes based on 1,4-diamino-9,10-anthraquinone-2-sulfonic acid, as are described, for example, in German Offenlegungsschriften Nos. 1 544 354 and 1 934 518. In these dyes the fiber-reactive group consists of a triazine radical attached via an aromatic bridging member to the amino group in position 4 of the anthraquinone.

With the present invention, novel anthraquinone compounds have now been found which conform to the formula (1)

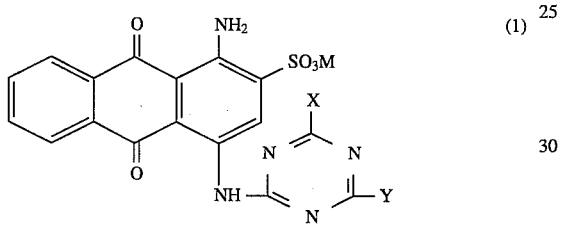

(1)

in which:

M is hydrogen or an alkali metal such as sodium, potassium or lithium;

X is fluorine, chlorine or a group of the formula (2a) or (2b)

 (2a)

 (2b)

in which $R^A$ is alkyl of 1 to 10 carbon atoms, preferably of 1 to 4 carbon atoms, such as methyl and ethyl, or is cycloalkyl of 5 to 8 carbon atoms, such as cyclohexyl, which may be further substituted by 1 or 2 methyl groups, or is alkyl of 2 to 8 carbon atoms which is interrupted by one or two hetero-groups, for example by hetero-groups selected from the group consisting of —O—, —NH—, —NH—CO—, —CO—NH—, —CO—, —SO₂—, —NH—SO₂— or —SO₂—NH—, or is benzyl or sulfoalkyl of 1 to 4 carbon atoms, such as sulfomethyl and β-sulfoethyl, preferably β-sulfoethyl, or is phenyl which is substituted by 1 or 2 sulfo groups and/or 1 carboxy group, and $R^B$ is hydrogen, alkyl of 1 to 10 carbon atoms, preferably of 1 to 4 carbon atoms, such as methyl and ethyl, or is cycloalkyl of 5 to 8 carbon atoms, such as cyclohexyl, which may be further substituted by 1 or 2 methyl groups, or is alkyl of 2 to 8 carbon atoms which is interrupted by one or two hereto-groups, for example by hetero-groups selected from the group consisting of —O—, —NH—, —NH—CO—, —CO—NH—, —CO—, —SO₂—, —NH—SO₂— or —SO₂—NH—, or is benzyl or sulfoalkyl of 1 to 4 carbon atoms, such as sulfomethyl and β-sulfoethyl, or is cyano, preferably cyano;

Y is fluorine, chlorine or a group of the formula (3)

 (3)

in which $R^o$ is a group of the formula (4a), (4b) or (4c)

 (4a)

 (4b)

 (4c)

in which

M is as defined above,

Z is vinyl or is ethyl which is substituted in the β-position by a substituent which can be eliminated by alkali to form the vinyl group, alk is alkylene of 2 to 4 carbon atoms, $R^1$ is hydrogen, carboxy, sulfo or preferably a group of the formula —SO₂—Z— in which Z is as defined above, $R^2$ is hydrogen, alkyl of 1 to 4 carbon atoms such as ethyl and, in particular, methyl, alkoxy of 1 to 4 carbon atoms such as ethoxy and, in particular, methoxy, chlorine, bromine, carboxy, sulfo or nitro, preferably hydrogen, alkyl of 1 to 4 carbon atoms, alkoxy of 1 to 4 carbon atoms or sulfo, $R^3$ is hydrogen, alkyl of 1 to 4 carbon atoms such as ethyl and, in particular, methyl, alkoxy of 1 to 4 carbon atoms such as ethoxy and, in particular, methoxy, chlorine or bromine, preferably hydrogen or alkoxy of 1 to 4 carbon atoms, and $R^4$ is hydrogen, sulfo or carboxy, preferably hydrogen or sulfo, or Y is a group of the formula (5a)

 (5a)

in which Z and alk are as defined above, or

Y is a group of the formula (5b)

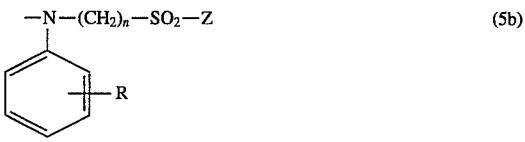 (5b)

in which

Z is as defined above, n is a number from 1 to 4, preferably 2 or 3, and

R is hydrogen or sulfo.

In the abovementioned formulae and likewise in the formulae given below the individual formula components, both with different meanings and with identical meanings within a general formula, may within the scope of their definition have meanings which are the same as or different from one another.

The groups sulfo, carboxy, thiosulfate, phosphato and sulfato include both the acid form and the salt form of these groups. Accordingly, sulfo groups are groups of the formula —$SO_3M$, carboxy groups are groups of the formula —COOM, thiosulfate groups are groups of the formula —S—$SO_3M$, phosphato groups are groups of the formula —$OPO_3M_2$ and sulfato groups are groups of the formula —$OSO_3M$, in which M is as defined above.

Examples of alkali-eliminable substituents which are located in the β-position of the ethyl group of Z are halogen atoms such as bromine and chlorine, ester groups of organic carboxylic and sulfonic acids, such as those of alkylcarboxylic acids, substituted or unsubstituted benzenecarboxylic acids and substituted or unsubstituted benzenesulfonic acids, such as the groups alkanoyloxy of 2 to 5 carbon atoms, and of these especially acetyloxy, benzoyloxy, sulfobenzoyloxy, phenylsulfonyloxy and tolylsulfonyloxy, acidic ester groups of inorganic acids, such as those of phosphoric acid, sulfuric acid and thiosulfuric acid (phosphato, sulfato and thiosulfate groups), and also dialkylamino groups with alkyl groups of in each case 1 to 4 carbon atoms, such as dimethylamino and diethylamino. Z in formulae (4b) and (4c) is preferably β-sulfatoethyl or vinyl and is with especial preference β-sulfatoethyl, while in formulae (4a) and (5b) it is preferably β-sulfatoethyl, β-chloroethyl or vinyl and is with particular preference β-chloroethyl or vinyl.

Examples of radicals X are methoxy, ethoxy, propoxy, ethoxymethoxy, β-ethoxyethoxy, β-aminoethoxy, benzyloxy, sulfomethoxy, β-sulfoethoxy, methylamino, ethylamino, propylamino, cyclohexylamino, β-(ethylamino)ethylamino, β-ethoxyethylamino, benzylamino, β-sulfoethylamino, cyanoamino, fluorine and chlorine and also 3-sulfophenoxy, 4-sulfophenoxy and 3,5-disulfophenoxy, among which 4-sulfophenoxy is preferred. X is preferably fluorine, chlorine or cyanoamino.

Y is preferably a group of the formula (3) where $R^o$ is a group of the formula (4a) or (4b) in which $R^1$ is hydrogen or preferably β-sulfatoethylsulfonyl or vinylsulfonyl, $R^2$ is hydrogen, methyl, methoxy or ethoxy, $R^3$ is hydrogen, methoxy or ethoxy and Z is vinyl or β-sulfatoethyl. Furthermore, Y is preferably a group of the formula (5a) or (5b) in which alk is 1,2-ethylene or 1,3-propylene, Z is vinyl or β-sulfatoethyl and n is the number 2 or 3. In formula (4c) the free bond is preferably in the β-position on the naphthalene ring system.

Examples of groups of the formulae (4a), (4b) and (4c) in the radical Y are 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro-4-(β-sulfatoethylsulfonyl)phenyl, 2-bromo-4-(β-sulfatoethylsulfonyl)phenyl, 4-methoxy-3-(β-sulfatoethylsulfonyl)phenyl, 4-chloro-3-(β-sulfatoethylsulfonyl)phenyl, 2-ethoxy-4- or -5-(β-sulfatoethylsulfonyl)phenyl, 2-methyl-4-(β-sulfatoethylsulfonyl)phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5-(β-chloroethylsulfonyl)phenyl, 2-hydroxy-5-(β-sulfatoethylsulfonyl)phenyl, 2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, β-vinylsulfonylethyl, β-(β'-chloroethylsulfonyl)ethyl, β-(β'-sulfatoethylsulfonyl)ethyl, γ-(β'-chloroethylsulfonyl)propyl, γ-(β'-sulfatoethylsulfonyl)propyl and γ-(vinylsulfonyl)propyl.

Examples of radicals of the formulae (5a) and (5b) are β-(β'-sulfatoethylsulfonyl)ethylamino, β-(β'-chloroethylsulfonyl)ethylamino, γ-(β'-sulfatoethylsulfonyl)propylamino, γ-(β'-chloroethylsulfonyl)propylamino, β-(vinylsulfonyl)ethylamino, γ-(vinylsulfonyl)propylamino, N-phenyl-N-[β-(β'-sulfatoethylsulfonyl)ethyl]amino, N-phenyl-N-[β-(β'-chloroethylsulfonyl)ethyl]amino, N-phenyl-N-[γ-(β'-chloropropylsulfonyl)propyl]amino, N-phenyl-N-[γ-(β'-sulfatopropylsulfonyl)propyl]amino, N-(4'-sulfophenyl)-N-[β-(β'-sulfatoethylsulfonyl)ethyl]amino, N-(4'-sulfophenyl)-N-[β-(β'-chloroethylsulfonyl)ethyl]amino, N-(4'-sulfophenyl)-N-[γ-(β'-chloroethylsulfonyl)propyl]amino, N-(4'-sulfophenyl)-N-[γ-(β'-sulfatoethylsulfonyl)propyl]amino, N,N-bis[β-(β'-chloroethylsulfonyl)ethyl]amino, N,N-bis[γ-(β'-chloroethylsulfonyl)propyl]amino, bis(β-vinylsulfonylethyl)amino, N-(3'-sulfophenyl)-N-[β-(β'-sulfatoethylsulfonyl)ethyl]amino, N-(3'-sulfophenyl)-N-[β-(β'-chloroethylsulfonyl)ethyl]amino, N-(3'-sulfophenyl)-N-[γ-(β'-chloroethylsulfonyl)propyl]amino and N-(3'-sulfophenyl)-N-[γ-(β'-sulfatoethylsulfonyl)propyl]amino.

Of the anthraquinone compounds according to the invention of the formula (1), particular preference is given to those in which X is chlorine, fluorine or cyanoamino and Y is a group of the formula (3) where $R^o$ is a group of the formula (4a) or a group of the formula (4b) in each of which $R^1$ is a group of the formula —$SO_2$—Z, or is a group of the formula (5b).

The present invention also relates to a process for the preparation of the anthraquinone compounds according to the invention of the formula (1), which comprises reacting with one another a compound of the formula (6)

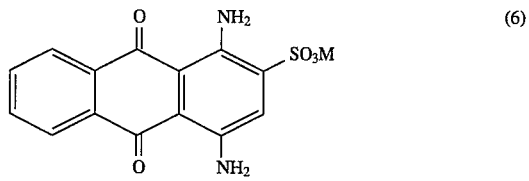

(6)

in which M is as defined above and a compound of the formula (7)

(7)

in which X and Y are as defined above and Hal is chlorine or fluorine, or comprises reacting a compound of the formula (8)

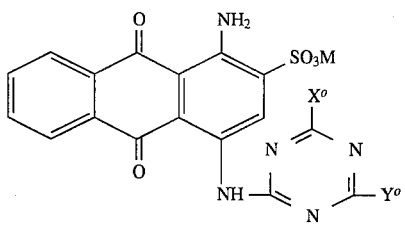

(in which M is as defined above, $X^o$ has one of the meanings of X and $Y^o$ has one of the meanings of Y, but with the proviso that at least one of the radicals $X^o$ and $Y^o$ is fluorine or chlorine) if $X^o$ is chlorine or fluorine with a compound of the formula HO—$R^A$ or $H_2N$—$R^B$ where $R^A$ and $R^B$ are as defined above, and if $Y^o$ is chlorine or fluorine with a compound of the formula $H_2N$—$R^o$ where $R^o$ is as defined above, or with a compound of the formula HN(alk-$SO_2$—Z)$_2$ where alk and Z are as defined above, or with a compound of the formula (9)

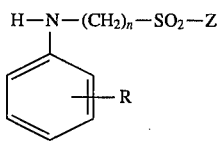

(9)

in which R, n and Z are as defined above.

The abovementioned reactions of amino- and/or hydroxy-containing starting compounds with a chlorine- or fluorine-containing triazine starting compound are carried out in an aqueous or aqueous-organic medium in suspension or solution. If the reaction is carried out in an aqueous-organic medium, then the organic medium is, for example, acetone, dimethylformamide, dimethyl sulfoxide or N-methylpyrrolidone. It is advantageous if the hydrogen halide liberated during the condensation is continually neutralized by adding aqueous alkali metal hydroxides, alkali metal carbonates or alkali metal bicarbonates.

The condensation reaction of a chlorine- or fluorine-substituted triazine of the formula (7) with the anthraquinone of the formula (6) is generally carried out at a temperature of between −5° C. and +90° C., if X is fluorine or chlorine and Y is a group of the formula (3), (5a) or (5b) preferably at a temperature of between −5° C. and +25° C. and at a pH of between 6 and 8. If X in formula (7) is a group of the formula (2a) or (2b) and Y is a group of the formula (3), (5a) or (5b), then the reaction is generally carried out at a pH of between 1 and 5 and at a temperature of between 50° and 90° C.

The reaction of the starting compounds of the formula (8) where $X^o$ and $Y^o$ are chlorine or fluorine with a compound of the formula H—Y where Y is a group of the formula (3), (5a) or (5b) is generally carried out at a temperature of between −5° C. and +70° C. and at a pH of between 3 and 8, if $X^o$ and $Y^o$ are chlorine preferably at a temperature of between 30° and 60° C. and at a pH of between 3.5 and 5.5, and if $X^o$ and $Y^o$ are fluorine preferably at a temperature of between 0° and 30° C. and at a pH of between 6 and 7.5.

The synthesis of the starting compounds of the formula (8) in which $X^o$ and $Y^o$ are both chlorine or fluorine is achieved by reacting an anthraquinone compound of the formula (6) with cyanuric chloride at a temperature of between about −5° C. and about +30° C., preferably between 0° and 20° C., and at a pH of between about 4 and about 6, or, respectively, with cyanuric fluoride at a temperature of between −5° C. and +30° C., preferably between −5° C. and +5° C., and at a pH of between 4 and 7. These reactions are also carried out in an aqueous or aqueous-organic medium.

The starting compounds of the formulae given above are generally known or can be prepared in accordance with the prior art in analogy to known procedures. Some of the starting compounds of the formula (9) have not per se been described beforehand. These amino compounds can be prepared, for example, by reacting N-allyl-N-acetylaniline (see J. Org. Chem. 14, 1099 (1949)) with 2-mercaptoethanol in the presence of a free-radical initiator by a procedure analogous to that described in German Offenlegungsschrift No. 41 06 106, and oxidizing the resulting N-[γ-(β'-hydroxyethylthio)propyl]-N-acetylaniline compound to give the sulfonyl compound, for example by means of hydrogen peroxide in the presence of a catalytic amount of a transition metal compound such as, for example, tungsten oxide. The acetyl group of the sulfonyl compound obtained in this way is removed by hydrolysis under alkaline or acid conditions, preferably in an aqueous solution of hydrochloric acid, for example in from 5 to 30% strength aqueous hydrochloric acid, at a temperature of between 80° and 100° C. The resulting N-phenyl-N-[γ-(β'-hydroxyethylsulfonyl)propyl]amine can be separated off from the aqueous phase of the neutralized aqueous synthesis solution. The β-hydroxyethylsulfonyl group of this compound can be esterified by conventional methods, for example using concentrated sulfuric acid at a temperature of between 10° and 30° C., to give the β-sulfatoethylsulfonyl compound.

Causing the compounds prepared in accordance with the invention, of the formula (1)—referred to below as compounds (1)—to deposit from the synthesis batches is carried out by generally known methods, either by precipitation from the reaction medium using electrolytes, for example sodium chloride or potassium chloride, or by evaporative concentration of the reaction solution, for example by spray drying with the possible addition of a buffer substance to this reaction solution.

The compounds (1) have fiber-reactive properties and possess very good dye properties. They can therefore be used for dyeing hydroxy- and/or carboxamido-containing material, especially fiber material. They can also be used directly as liquid preparations for dyeing applications, in the form of the solutions which are obtained in the synthesis, if desired after the addition of a buffer substance and if desired after concentration.

The present invention therefore also relates to the use of the compounds (1) for dyeing hydroxy- and/or carboxamido-containing materials and to processes for dyeing such materials, in which the compound (1) is applied to the material or incorporated into the material and is fixed on or in the material by means of heat or by means of an alkali or by means of both measures. The term dyeing here includes mass coloring, for example of polyamide sheets, and printing. The materials are preferably employed in the form of fiber materials, especially in the form of textile fibers, such as in the form of fabrics and of yarns which are, for example, in the form of hanks and packages.

Hydroxy-containing materials are natural or synthetic hydroxy-containing materials such as, for example, cellulose fiber materials or their regenerated products and polyvinyl alcohols. Cellulose fiber materials are preferably cotton but may also be other plant fibers such as linen, hemp, jute and ramie fibers; examples of regenerated cellulose fibers are staple viscose and filament viscose.

Carboxamido-containing materials are, for example, synthetic and natural polyamides and polyurethanes, in particular in the form of fibers, for example wool and other animal hairs, silk, leather, nylon 6.6, nylon 6, nylon 11 and nylon 4.

The compounds (1) can be applied to and fixed on the abovementioned substrates, especially to and on the abovementioned fiber materials, by the application techniques which are known for water-soluble dyes, especially for fiber-reactive dyes. Thus these compounds, when applied to cellulose fibers by the exhaust process from a long liquor using a wide variety of acid-binding agents and, if desired, neutral salts such as sodium chloride or sodium sulfate, give dyeings having very good color yields and excellent color buildup with high degrees of fixation. Dyeing is carried out in an aqueous bath at temperatures of between 40° and 105° C., if desired under superatmospheric pressure at temperatures of up to 120° C., and if desired in the presence of conventional dyeing assistants. One possible procedure here is to introduce the material into the warm bath, to gradually heat the bath to the desired dyeing temperature and to complete the dyeing process at this temperature. The neutral salts which speed up the exhaustion of the compounds (1) can also if desired be added to the bath only after the actual dyeing temperature has been reached.

The padding method also produces, especially on cellulose fibers, dyeings having an excellent color yield with a high degree of fixation and with very good color buildup, and fixing can be brought about by hatching at room temperature or at elevated temperature, for example up to about 60° C., by steaming or with dry heat in a conventional manner.

Similarly, the conventional printing processes for cellulose fibers—which can either be carried out in single phase, for example by printing with a print paste containing sodiumcarbonate or another acid-binding agent and the compound (1) and subsequent steaming at from 100° to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching of this treated material or subsequent steaming or subsequent treatment with dry heat—produce strong prints with well-defined contours and a clear white ground. Changing the fixing conditions has only a small effect on the outcome of the prints. Not only in dyeing but also in printing, the degrees of fixation obtained with the compounds (1) are very high.

When fixing by means of dry heat by the customary thermo-fix processes, hot air at from 120° to 200° C. is used. In addition to the customary steam at from 101° to 103° C. it is also possible to employ superheated steam and high-pressure steam at temperatures of up to 160° C.

Acid-binding agents responsible for fixing the compounds (1) to the cellulose fibers are for example water-soluble basic salts of alkali metals and of alkaline earth metals of inorganic or organic acids, and also compounds which release alkali under hot conditions. Particular mention is made of the alkali metal hydroxides and alkali metal salts of weak to medium-strength inorganic or organic acids, the term alkali metal compounds referring preferably to the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, sodium silicate or trisodiumphosphate.

Treating the compounds (1) with the acid-binding agents with or without the action of heat bonds these compounds chemically to the cellulose fiber; dyeings on cellulose, in particular, after having been given the usual after-treatment of rinsing to remove unfixed portions of the compounds (1), show excellent wetfastness properties, especially since such unfixed portions can be readily washed off because of their good cold-water solubility.

The dyeings on polyurethane and polyamide fibers are customarily carried out from an acidic medium. Thus, for example, the dye bath may contain acetic acid and/or ammonium sulfate or acetic acid and ammonium acetate or sodium acetate which has been added to bring the bath to the desired pH. To obtain a dyeing of useful levelness it is advisable to add customary leveling assistants, for example those based on a reaction product of cyanuric chloride with three times the molar quantity of an aminobenzenesulfonic acid and/or an aminonaphthalenesulfonic acid, or those based on a reaction product of, for example, stearylamine with ethylene oxide. In general the material to be dyed is introduced into the bath at a temperature of about 40° C. and agitated therein for some time, the dye bath is then adjusted to the desired weakly acid, preferably weakly acetic acid, pH, and the actual dyeing is carried out at a temperature of between 60° and 98° C. However, the dyeings can also be carried out at the boiling temperature or at temperatures of up to 120° C. (under superatmospheric pressure).

The dyeings and prints produced with the compounds (1) are distinguished by clear shades. The dyeings and prints on cellulose fiber materials, in particular, additionally possess—as already mentioned—high color strength, good lightfastness and good wetfastness properties, such as fastness to washing, milling, water, salt water, cross-dyeing and perspiration, and also good fastness to dry heat setting, ironing and rubbing.

Particular emphasis should be placed on the high fixing yields which can be achieved on cellulose fiber materials with the dyes of the invention, which yields may be over 90% when pressure processes and pad-dyeing processes are used. A further advantage of the compounds (1) consists in the ease of washoff of the portions which remain unfixed in the course of the printing or dyeing operation, which makes it possible to realize the washing operation of the printed or dyed cellulose fiber materials with low quantities of washing liquor and, if desired, with an energy-saving temperature programduring the washing operation.

The Examples which follow are intended to illustrate the invention. Parts and percentages are by weight unless specified otherwise. Parts by weight bear the same relation to parts by volume as the kilogram to the liter.

The compounds described by way of formulae in the Examples are given in the form of the free acid; in general they are prepared and isolated in the form of their alkali metal salts, such as lithium, sodium or potassium salts, and are used for dyeing in the form of their salts. Likewise, starting compounds and components which are specified in the form of the free acid in the Examples which follow, especially the Tabular Examples, may be employed in the synthesis as such or in the form of their salts, preferably alkali metal salts.

The absorption maxima ($\lambda_{max}$) in the visible range which are indicated for the dyes of the invention were determined using aqueous solutions of their alkali metal salts. In the Tabular Examples the $\lambda_{max}$ values are in brackets after the color; the wavelength figure is in nm.

EXAMPLE 1

4.3 parts of cyanamide are added with thorough stirring to a suspension of 18.4 parts of cyanuric chloride in 200 parts of water and 200 parts of ice. A pH of 9 is established by means of concentrated aqueous sodium hydroxide solution and the reaction is carried out to completion while maintaining this pH for about two hours at a temperature of between 0° and 3° C. Dilute aqueous hydrochloric acid is then added until the pH reaches 5, and then 29.5 parts of 4-(β-sulfatoethylsulfonyl)aniline are added and the reaction is continued for about four hours at a temperature of from about 5° to 8° C., during which the pH falls to 1 to 1.5. A pH of 5.5 is then established using sodium carbonate and the resulting synthesis solution is added to a solution of 31.8 parts of 1,4-diamino-9,10-anthraquinone-2-sulfonic acid in 600 parts of water. The reaction is carried out at a pH of 3.5 and at a temperature of 75° C. for about two hours, then the mixture is cooled to room temperature and the anthraquinone compound of the invention is isolated in a conventional manner, for example by salting out with potassium chloride, as an alkali metal salt (sodium or potassium salt).

Written in the form of the free acid, the anthraquinone compound of the invention has the formula

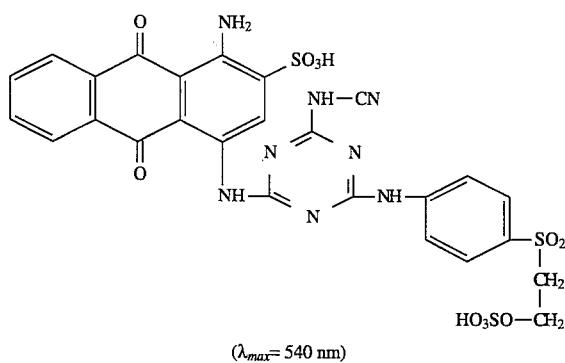

($\lambda_{max}$= 540 nm)

It has very good fiber-reactive dye properties and, when employed according to the application methods which are customary in the art for fiber-reactive dyes, produces on the fiber materials specified in the description, especially cellulose fiber materials, dyeings in strong reddish blue shades with good fastness properties, among which the good light-fastness is worthy of particular emphasis.

EXAMPLE 2

31.8 parts of 1,4-diamino-9,10-anthraquinone-2-sulfonic acid are introduced with thorough stirring into a suspension of 18 parts of cyanuric chloride in 200 parts of water and 200 parts of ice, a pH of 4.5 is established using aqueous sodiumhydroxide solution, and the reaction is carried out for about two hours at from 0° to 3° C. while maintaining this pH. The mixture is then heated to 20° C. over the course of 30 minutes, 29.5 parts of 4-(β-sulfatoethylsulfonyl)aniline are added and the second condensation reaction is carried out for about four hours at a pH of 5.5 and at from 45° to 50° C. The mixture is then cooled and the anthraquinone compound of the invention is isolated in a conventional manner, for example by salting out with potassium chloride, as an alkali metal salt (sodium or potassium salt); written in the form of the free acid it has the formula

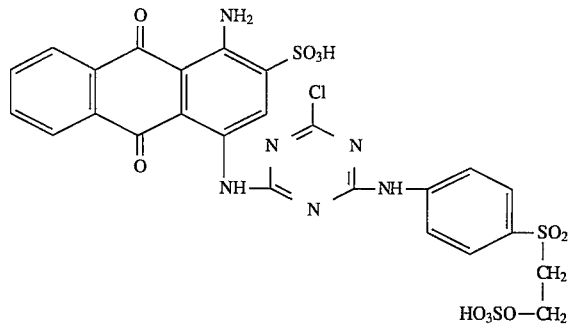

($\lambda_{max}$= 544 nm)

The anthraquinone compound of the invention possesses very good fiber-reactive properties and, when employed as a dye by the dyeing and printing processes which are customary in the art for fiber-reactive dyes, it produces strong reddish blue dyeings and prints on the materials specified in the description, for example cellulose fiber materials such as cotton. The dyeings are distinguished by good fastness properties, among which the light-fastness is worthy of particular emphasis.

EXAMPLE 3

In order to prepare an anthraquinone compound of the invention the procedure of Example 2 is repeated but employing as starting compound, instead of 4-(β-sulfatoethylsulfonyl)aniline, the equivalent quantity of 3-(β-sulfatoethylsulfonyl)aniline. In aqueous solution the anthraquinone compound according to the invention shows an absorption maximum at 546 nm and possesses the same good dye properties as the anthraquinone compound according to the invention of Example 2. It likewise produces, when applied for example to cotton, strong reddish blue dyeings and prints with good fastness properties, in particular a good lightfastness.

EXAMPLE 4

18.3 parts of cyanuric fluoride are stirred into a solution, at 0° C. and at a pH of 6.8, of 31.1 parts of 1,4-diamino-9,10-anthraquinone-2-sulfonic acid and 14.2 parts of disodiumhydrogen phosphate in 600 parts of water, the mixture is stirred for about ten minutes more at a pH of 6.8, and then 28.1 parts of 4-(β-sulfatoethylsulfonyl)aniline are added, the mixture is stirred for a further two hours at from 20° to 25° C. while maintaining a pH of from 6.5 to 7.0, and then the anthraquinone compound of the invention is isolated by salting out with potassium chloride. Written in the form of the free acid it has the formula

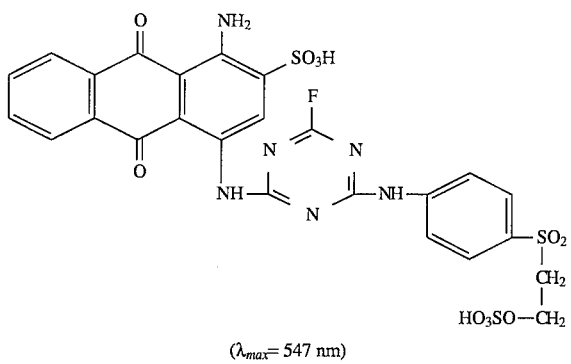

($\lambda_{max}$= 547 nm)

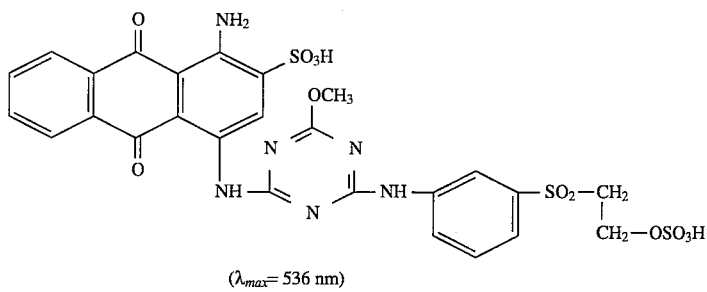

($\lambda_{max}$= 536 nm)

and dyes cotton, for example, by the application methods which are customary in the art for fiber-reactive dyes in strong reddish blue shades with good fastness properties, among which the good lightfastness is worthy of particular emphasis.

EXAMPLE 5

18.3 parts of cyanuric fluoride are stirred into a solution, at 0° C. and at a pH of 6.8, of 13.1 parts of 1,4-diamino-9,10-anthraquinone-2-sulfonic acid and 14.2 parts of disodiumhydrogen phosphate in 600 parts of water, the mixture is stirred for about 10 minutes more at a pH of 6.8, and then 17.3 parts of 2-sulfoaniline are added and the second condensation reaction is carried out for about two hours at from 20° to 25° C. while maintaining a pH of from 6.5 to 7.0, until it is complete. The anthraquinone compound of the invention is isolated by salting out with potassium chloride. Written in the form of the free acid it has the formula

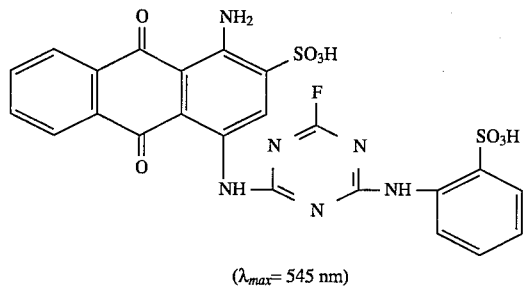

($\lambda_{max}$= 545 nm)

and, when employed as a fiber-reactive dye on cotton, for example, produces strong reddish blue dyeings and prints with good fastness properties, among which the good lightfastness is worthy of particular emphasis.

EXAMPLE 6

22.8 parts of cyanuric chloride are introduced into a suspension of 10.3 parts of sodium hydrogen carbonate in 100 parts by volume of methanol and the reaction is carried out at below 20° C., then 50 parts of water are added, the precipitate formed is filtered off with suction and introduced into a solution of 31.8 parts of 1,4-diamino-9,10-anthraquinone-2-sulfonic acid in 600 parts of water, and the reaction is carried out for about 12 hours at 20° C. and at a pH of 6. The mixture is subsequently adjusted with dilute hydrochloric acid to a pH of 4.5, 29.5 parts of 3-(β-sulfatoethylsulfonyl)aniline are added and the mixture is stirred for about two hours more at from 85° to 90° C. The anthraquinone compound of the invention is isolated at room temperature by salting out with potassium chloride. Written in the form of the free acid it has the formula and possesses very good dye properties and, when employed according to the application methods which are customary in the art for fiber-reactive dyes, produces on the fiber materials specified in the description, especially cellulose fiber materials, dyeings in strong reddish blue shades with good fastness properties, among which the good lightfastness is worthy of particular emphasis.

EXAMPLE 7

31.8 parts of 1,4-diamino-9,10-anthraquinone-2-sulfonic acid are stirred into a suspension of 18 parts of cyanuric chloride in 200 parts of water and 200 parts of ice; a pH of 4.5 is established using aqueous sodium hydroxide solution and the reaction is completed over about two hours while maintaining this pH and at a temperature of from 0° to 3° C. The mixture is then heated to 20° C. over the course of 30 minutes, 17.4 parts of 4-sulfophenol are added and the second condensation reaction is carried out at a pH of 8.5 and at a temperature of from 40° to 45° C. for about seven hours. Subsequently the mixture is cooled to room temperature and the anthraquinone compound of the invention is isolated in a conventional manner, for example by salting out with potassium chloride, as an alkali metal salt (sodium or potassium salt); written in the form of the free acid it has the formula

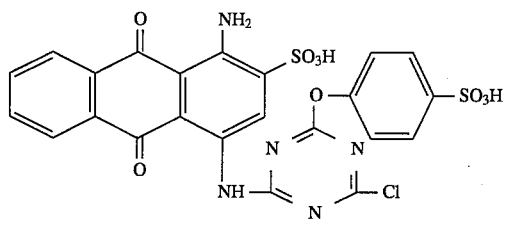

($\lambda_{max}$= 546 nm)

It possesses very good fiber-reactive properties and, when employed as a dye by the dyeing and printing processes which are customary in the art for fiber-reactive dyes, produces strong reddish blue dyeings and prints on the materials specified in the description, for example cellulose fiber materials such as cotton. The dyeings are distinguished by good fastness properties, among which the lightfastness is worthy of particular emphasis.

EXAMPLES 8 to 66

In the Tabular Examples which follow, further anthraquinone compounds according to the invention of the formula (1) are described by reference to their components. They can be prepared in the manner of the invention, for example in analogy to one of the above Examples, from the starting compounds (1,4-diamino-9,10-anthraquinone-2-sulfonic acid, cyanuric chloride or cyanuric fluoride and a compound of the formula H—X and of the formula H—Y) which are evident from the formula (1) and from the relevant Tabular Example. They possess very good fiber-reactive dye properties and dye the materials specified in the description, especially cellulose fiber materials, in the color which is indicated in the particular Tabular Example (in this case for cotton) with high tinctorial strength and with good fastness properties.

| | Anthraquinone compound of the formula (1) | | |
|---|---|---|---|
| Ex. | radical X | radical Y | color |
| 7 | cyanoamino | 3-(β-sulfatoethylsulfonyl)phenylamino | reddish blue (542) |
| 8 | cyanoamino | 2-methoxy-5-(β-sulfatoethylsulfonyl)phenylamino | reddish blue |
| 9 | cyanoamino | 4-(vinylsulfonyl)phenylamino | reddish blue (539) |
| 10 | chloro | 2-methoxy-5-(β-sulfatoethylsulfonyl)phenylamino | reddish blue (543) |
| 11 | chloro | 4-(vinylsulfonyl)phenylamino | reddish blue |
| 12 | chloro | 2-sulfophenylamino | reddish blue |
| 13 | chloro | 3-sulfophenylamino | reddish blue |
| 14 | chloro | 4-sulfophenylamino | reddish blue (541) |
| 15 | chloro | γ-(β'-chloroethylsulfonyl)propylamino | reddish blue |
| 16 | chloro | γ-(vinylsulfonyl)propylamino | reddish blue |
| 17 | chloro | N-phenyl-N-[β-(β'-sulfatoethylsulfonyl)ethyl]amino | reddish blue (545) |
| 18 | chloro | N-(4-sulfophenyl)-N-[β-(β'-sulfatoethylsulfonyl)ethyl]amino | reddish blue |
| 19 | chloro | N-phenyl-N-[γ-(β'-sulfatoethylsulfonyl)propyl]amino | reddish blue |
| 20 | chloro | N-(3-sulfophenyl)-N-[γ-(β'-sulfatoethylsulfonyl)propyl]amino | reddish blue |
| 21 | chloro | N-(4-sulfophenyl)-N-[γ-(β'-sulfatoethylsulfonyl)propyl]amino | reddish blue (542) |
| 22 | chloro | bis-(β-vinylsulfonylethyl)amino | reddish blue (546) |
| 23 | chloro | bis-[β-(β'-chloroethylsulfonyl)ethyl]amino | reddish blue |
| 24 | chloro | γ-(β'-sulfatoethylsulfonyl)propylamino | reddish blue |
| 25 | chloro | β-(β'-chloroethylsulfonyl)ethylamino | reddish blue (542) |
| 26 | chloro | β-(β'-sulfatoethylsulfonyl)ethylamino | reddish blue |
| 27 | fluoro | 3-sulfophenylamino | reddish blue |
| 28 | fluoro | 4-sulfophenylamino | reddish blue |
| 29 | fluoro | 3-(β-sulfatoethylsulfonyl)phenylamino | reddish blue (541) |
| 30 | fluoro | 2-methoxy-5-(β-sulfatoethylsulfonyl)phenylamino | reddish blue |
| 31 | fluoro | 4-(vinylsulfonyl)phenylamino | reddish blue (544) |
| 32 | fluoro | γ-(β'-chloroethylsulfonyl)propylamino | reddish blue |
| 33 | fluoro | γ-(β'-sulfatoethylsulfonyl)propylamino | reddish blue |
| 34 | fluoro | γ-(vinylsulfonyl)propylamino | reddish blue (543) |
| 35 | fluoro | β-(β'-chloroethylsulfonyl)ethylamino | reddish blue |
| 36 | fluoro | β-(β'-sulfatoethylsulfonyl)ethylamino | reddish blue |
| 37 | fluoro | N-phenyl-N-[β-(β'-sulfatoethylsulfonyl)ethyl]amino | reddish blue (548) |
| 38 | fluoro | N-(4-sulfophenyl)-N-[β-(β'-sulfatoethylsulfonyl)ethyl]amino | reddish blue (549) |
| 39 | fluoro | N-phenyl-N-[γ-(β'-sulfatoethylsulfonyl)propyl]amino | reddish blue |
| 40 | fluoro | N-(3-sulfophenyl)-N-[γ-(β'-sulfatoethylsulfonyl)propyl]amino | reddish blue |
| 41 | fluoro | N-(4-sulfophenyl)-N-[γ-(β'-sulfatoethylsulfonyl)propyl]amino | reddish blue |
| 42 | fluoro | bis-(β-vinylsulfonylethyl)amino | reddish blue (545) |
| 43 | fluoro | bis-[β-(β'-chloroethylsulfonyl)ethyl]amino | reddish blue |
| 44 | fluoro | bis-[γ-(β'-chloroethylsulfonyl)propyl]amino | reddish blue |
| 45 | methoxy | 4-(β-sulfatoethylsulfonyl)phenylamino | reddish blue (538) |
| 46 | methoxy | 2-methoxy-5-(β-sulfatoethylsulfonyl)phenylamino | reddish blue |
| 47 | methoxy | 4-(vinylsulfonyl)phenylamino | reddish blue (539) |
| 48 | methoxy | γ-(β'-sulfatoethylsulfonyl)propylamino | reddish blue |
| 49 | methoxy | γ-(β'-chloroethylsulfonyl)propylamino | reddish blue (544) |
| 50 | methoxy | β-(β'-sulfatoethylsulfonyl)ethylamino | reddish blue |
| 51 | methoxy | β-(β'-chloroethylsulfonyl)ethylamino | reddish blue (546) |
| 52 | 3-sulfophenoxy | chloro | reddish blue (545) |
| 53 | 3,5-disulfophenoxy | chloro | reddish blue |
| 54 | 4-sulfophenoxy | fluoro | reddish blue |
| 55 | 3-sulfophenoxy | fluoro | reddish blue |
| 56 | 3,5-disulfophenoxy | fluoro | reddish blue (541) |
| 57 | 4-sulfophenoxy | 4-(β-sulfatoethylsulfonyl)phenylamino | reddish blue (541) |
| 58 | 4-sulfophenoxy | 3-(β-sulfatoethylsulfonyl)phenylamino | reddish blue |
| 59 | 4-sulfophenoxy | γ-(β'sulfatoethylsulfonyl)propylamino | reddish blue |
| 60 | 4-sulfophenoxy | β-(β'-sulfatoethylsulfonyl)ethylamino | reddish blue |
| 61 | 3-sulfophenoxy | 4-(β-sulfatoethylsulfonyl)phenylamino | reddish blue (542) |
| 62 | 3-sulfophenoxy | γ-(β'-sulfatoethylsulfonyl)propylamino | reddish blue |
| 63 | 3-sulfophenoxy | β-(β'-sulfatoethylsulfonyl)ethylamino | reddish blue |
| 64 | 3,5-disulfophenoxy | γ-(β'-sulfatoethylsulfonyl)propylamino | reddish blue |

15
-continued

| Anthraquinone compound of the formula (1) | | | |
|---|---|---|---|
| Ex. | radical X | radical Y | color |
| 65 | 3,5-disulfo-phenoxy | β-(β'-sulfatoethylsulfonyl)-ethylamino | reddish blue |
| 66 | 3,5-disulfo-phenoxy | 4-(β-sulfatoethylsulfonyl)-phenylamino | reddish blue (540) |

We claim:

1. An anthraquinone compound of the formula (1)

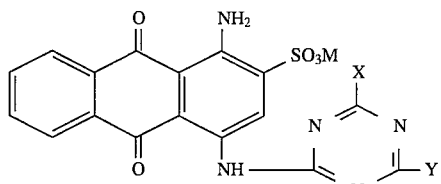

(1)

in which:

M is hydrogen or an alkali metal,

X is fluorine, chlorine or a group of the formula (2a) or (2b)

 (2a)

 (2b)

in which $R^A$ is alkyl of 1 to 10 carbon atoms, cycloalkyl of 5 to 8 carbon atoms unsubstituted or substituted by 1 or 2 methyl groups, or is alkyl of 2 to 8 carbon atoms which is interrupted by one or two hetero-groups, the hetero-groups selected from the group consisting of —O—, —NH—, —NH—CO—, —CO—NH—, —CO—, —SO$_2$—, —NH—SO$_2$— and —SO$_2$—NH—, or is benzyl or sulfoalkyl of 1 to 4 carbon atoms, or is phenyl which is substituted by 1 or 2 sulfo or 1 carboxy or both, and $R^B$ is hydrogen, alkyl of 1 to 10 carbon atoms, cycloalkyl of 5 to 8 carbon atoms unsubstituted or substituted by 1 or 2 methyl groups, or is alkyl of 2 to 8 carbon atoms which is interrupted by one or two hetero-groups, the hetero-groups selected from the group consisting of —O—, —NH—, —NH—CO—, —CO—NH—, —CO—, —SO$_2$—, —NH—SO$_2$— and —SO$_2$—NH—, or is benzyl, sulfoalkyl of 1 to 4 carbon atoms or cyano;

Y is a group of the formula (3)

 (3)

in which $R^o$ is a group of the formula (4a), (4b), or (4c)

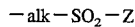 (4a)

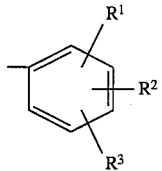 (4b)

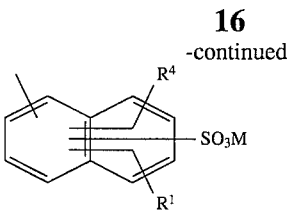 (4c)

in which

M is as defined above,

Z is vinyl or is ethyl which is substituted in the β-position by a substituent which is eliminated by alkali to form the vinyl group, alk is alkylene of 2 to 4 carbon atoms, $R^1$ is a group of the formula —SO$_2$—Z in which Z is as defined above, $R^2$ is hydrogen, alkyl of 1 to 4 carbon atoms, alkoxy of 1 to 4 carbon atoms, chlorine, bromine, sulfo or nitro, $R^3$ is hydrogen, alkyl of 1 to 4 carbon atoms, alkoxy of 1 to 4 carbon atoms, chlorine or bromine, and $R^4$ is hydrogen, sulfo or carboxy, or Y is a group of the formula (5a)

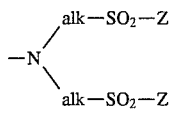 (5a)

in which Z and alk are as defined above, or is a group of the formula (5b)

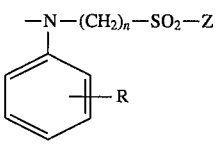 (5b)

in which

Z is as defined above, n is a number from 1 to 4, and

R is hydrogen or sulfo.

2. An anthraquinone compound as claimed in claim 1, wherein X is chlorine or fluorine.

3. An anthraquinone compound as claimed in claim 1, wherein X is cyanoamino.

4. A compound as claimed in claim 1, wherein Y is a radical of the formula

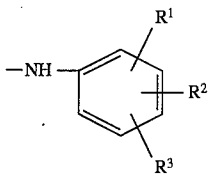

in which $R^1$ is a group of the formula —SO$_2$—Z in which Z is vinyl or is ethyl which is substituted in the β-position by a substituent which is eliminated by alkali to form the vinyl group, $R^2$ is hydrogen, alkyl of 1 to 4 carbon atoms, alkoxy of 1 to 4 carbon atoms, chlorine, bromine, carboxy, sulfo or nitro and $R^3$ is hydrogen, alkyl of 1 to 4 carbon atoms, alkoxy of 1 to 4 carbon atoms, chlorine or bromine.

5. A compound as claimed in claim 4, wherein $R^1$ is a group of the formula —$SO_2$—Z in which Z is vinyl or is ethyl which is substituted in the β-position by a substituent which is eliminated by alkali to form the vinyl group, $R^2$ is hydrogen, alkyl of 1 to 4 carbon atoms, alkoxy of 1 to 4 carbon atoms or sulfo and $R^3$ is hydrogen or alkoxy of 1 to 4 carbon atoms.

6. A compound as claimed in claim 1, wherein $R^2$ is hydrogen and $R^3$ is hydrogen or methoxy.

7. An anthraquinone compound as claimed in claim 1, wherein Z is vinyl, β-sulfatoethyl or β-chloroethyl.

8. An anthraquinone compound as claimed in claim 1 of the formula

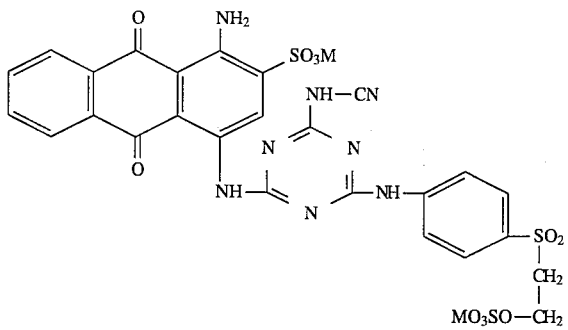

in which M is hydrogen or an alkali metal.

* * * * *